(12) United States Patent
Zhang et al.

(10) Patent No.: US 8,527,513 B2
(45) Date of Patent: Sep. 3, 2013

(54) SYSTEMS AND METHODS FOR LEXICON GENERATION

(75) Inventors: Paul Zhang, Centerville, OH (US); Harry Silver, Shaker Heights, OH (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 233 days.

(21) Appl. No.: 12/869,400

(22) Filed: Aug. 26, 2010

(65) Prior Publication Data

US 2012/0054220 A1    Mar. 1, 2012

(51) Int. Cl.
*G06F 17/30* (2006.01)

(52) U.S. Cl.
USPC .......................... 707/736; 707/758

(58) Field of Classification Search
USPC ................................. 707/736, 758
See application file for complete search history.

(56) References Cited

U.S. PATENT DOCUMENTS

| | | |
|---|---|---|
| 4,586,160 A | 4/1986 | Amano et al. |
| 4,594,686 A | 6/1986 | Yoshida |
| 4,773,009 A | 9/1988 | Kucera et al. |
| 5,331,554 A | 7/1994 | Graham |
| 5,369,577 A | 11/1994 | Kadashevich et al. |
| 5,680,628 A | 10/1997 | Carus et al. |
| 5,708,829 A | 1/1998 | Kadashevich et al. |
| 5,933,822 A | 8/1999 | Braden-Harder et al. |
| 5,991,713 A | 11/1999 | Unger et al. |
| 6,006,221 A | 12/1999 | Liddy et al. |
| 6,026,388 A | 2/2000 | Liddy et al. |
| 6,070,158 A | 5/2000 | Kirsch et al. |
| 6,282,507 B1 | 8/2001 | Horiguchi et al. |
| 6,330,530 B1 | 12/2001 | Horiguchi et al. |
| 6,349,275 B1 | 2/2002 | Schumacher et al. |
| 6,366,910 B1 | 4/2002 | Rajaraman et al. |
| 6,397,212 B1 | 5/2002 | Biffar |
| 6,615,237 B1 | 9/2003 | Kyne et al. |
| 6,745,181 B1 | 6/2004 | Chang et al. |
| 6,928,448 B1 | 8/2005 | Franz et al. |
| 7,343,372 B2 | 3/2008 | Chang et al. |
| 7,370,035 B2 | 5/2008 | Gross et al. |
| 2006/0123045 A1 | 6/2006 | Chang et al. |
| 2007/0220023 A1 | 9/2007 | Dean et al. |
| 2007/0239706 A1* | 10/2007 | Zhang et al. ............... 707/5 |
| 2009/0012842 A1 | 1/2009 | Srinivasan et al. |
| 2010/0281025 A1* | 11/2010 | Tsatsou et al. ............ 707/733 |
| 2011/0113028 A1* | 5/2011 | Staddon et al. ............ 707/723 |

OTHER PUBLICATIONS

Zhang, Paul et al., "Semantics-Based Legal Citation Network, Proceedings of the 11th Intenational Conference on Artificial Intelligence and Law", Jun. 7, 2007, Palo Alto, CA, pp. 123-130 [retrieved on Jul. 10, 2012]. Retrieved from the Internet:<URL:http://dl.acm.org/citation.cfm?id=1276342>.*

International Search Report and Written Opinion in corresponding PCT Application No. PCT/US11/47390, dated Nov. 15, 2011.

* cited by examiner

*Primary Examiner* — John E Breene
*Assistant Examiner* — Dennis Myint
(74) *Attorney, Agent, or Firm* — Dinsmore & Shohl LLP

(57) ABSTRACT

Disclosed herein are embodiments for lexicon generation. More specifically, at least one embodiment of a method includes determining a corpus term from a plurality of documents, generating a candidate term from the corpus term, and selecting a normalized term from the candidate term and the corpus term. Some embodiments include linking the normalized term with the candidate term and providing an electronic search capability for locating a first document, where the electronic search capability receives the candidate term as a search term and utilizes the normalized term to locate the first document.

15 Claims, 5 Drawing Sheets

SYSTEMS AND METHODS FOR LEXICON GENERATION

BACKGROUND

1. Field

Embodiments provided herein generally relate to increasing search functionality and efficiency for search and other natural language processing (NLP) tasks by generating a lexicon, and particularly to generating varied forms of terms and linking them to corresponding normalized forms to increase accuracy of user-performed functions.

2. Technical Background

As electronic systems convert documents and other data into electronic form, many of documents that have been converted are indexed to facilitate search, retrieval, and/or other functions. For example, legal documents, such as court decisions, briefs, motions, etc. may be stored and indexed for users to access electronically. As different legal documents may include different legal points pertaining to different jurisdictions, those documents may be indexed and organized accordingly. However, problems can arise when legal points do not have a standardized lexicon shared across all documents. In such situations, if a user inputs even a slightly different term or phrase than was used in a particular legal document, that legal document may not be retrieved in the ensuing search.

For example, a user may perform an electronic search for the term "lack of any evidence." While a present electronic searching system may be configured to retrieve documents that include this precise term, many electronic searching systems may be unable to retrieve documents (or other data) that include schematically equivalent variants of this term, such as "lacking evidence," "lack any evidence," "lacks evidence," etc. Accordingly, due to this failure to identify and match semantic equivalents, such electronic search systems may fail to retrieve many of the documents relevant to the original query terms, thus rendering the electronic search systems less effective for their intended purpose.

SUMMARY

In one embodiment, a method for lexicon generation may include determining a corpus term from a plurality of documents, generating a candidate term from the corpus term, and selecting a normalized term from the candidate term and the corpus term. Some embodiments include linking the normalized term with the candidate term and providing an electronic search capability for locating a first document, where the electronic search capability receives the candidate term as a search term and utilizes the normalized term to locate the first document.

In another embodiment, a system may include a memory component that stores lexicon generation logic configured to determine a corpus term from a plurality of documents and generate a candidate term from the corpus term. Additionally, the lexicon generation logic may be configured to cause the computer to select a normalized term from the candidate term and the corpus term and link the candidate term to the normalized term. Some embodiments include term equivalency generation logic configured to cause the computer to generate at least one equivalent term from the candidate term that is associated with the candidate term.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments provided herein generally relate to generating a lexicon based on contents from a large text corpus that contains groups of "semantically equivalent" terms comprised of variations of phrases and single words associated with a "normalized form" for that group. Such a lexicon will be useful in applications where it is crucial to make connections between text strings when they represent the same concepts but are expressed in varied forms in documents. Examples of such applications include, but are not limited to search engines, document clustering, and document term vector creation.

Additionally, embodiments disclosed herein include systems and methods for increasing electronic searching accuracy and efficiency by generating a lexicon from common terms and correlating these terms to a normalized term. More specifically, a corpus may include terms that are commonly used and can be assembled from a plurality of stored electronic documents. Within the corpus, candidate terms can be formed by creating a variation (and/or more than one variation) from the terms within the corpus. Additionally, a determination can be made regarding the frequency in which the corpus terms and the respective candidate term appear in at least a portion of the electronic documents. A normalized term can be selected from the corpus terms and the candidate terms. The systems and/or methods can then provide the capability of linking the normalized term with any documents that include the corpus terms or the candidate terms. Consequently, when users search for an electronic document using a term (whether it be the normalized term or one of the corpus terms), the user is provided with all documents that include the normalized term, the candidate terms, or the corpus term.

Figure 1:
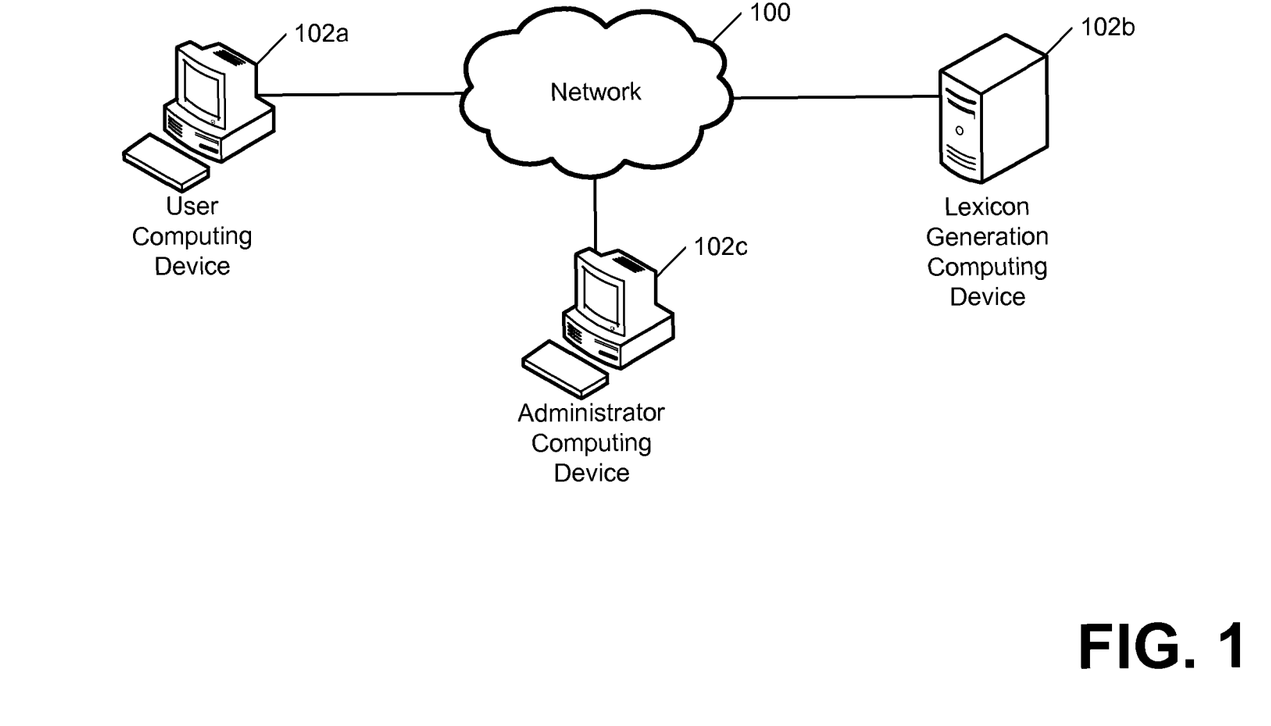
FIG. 1 depicts a computing network, illustrating components for a system for lexicon generation, according to embodiments shown and described herein.

Referring now to the drawings, FIG. 1 depicts an exemplary computing network, illustrating components for a system for lexicon generation, according to embodiments shown and described herein. As illustrated in FIG. 1, a computer network 100 may include a wide area network, such as the internet, a local area network (LAN), a mobile communications network, a public service telephone network (PSTN)

and/or other network and may be configured to electronically connect a user computing device 102a, a lexicon generation computing device 102b, and an administrator computing device 102c.

The user computing device 102a may initiate an electronic search for one or more documents. More specifically, to perform an electronic search, the user computing device 102a may send a request (such as a hypertext transfer protocol (HTTP) request) to the lexicon generation computing device 102b to provide a data for presenting an electronic search capability that includes providing a user interface to the user computing device 102. The user interface may be configured to receive a search request from the user and to initiate the search. The search request may include terms and/or other data for retrieving a document. The lexicon generation computing device 102b may search for documents related to the corpus terms and provide data for another user interface that allows for operations that may be utilized for the lexicon generation process.

As described herein, the lexicon generation computing device 102b may be configured to more effectively search for the desired electronic documents by determining a corpus term, creating candidate terms from the corpus terms, and selecting a normalized term from the corpus term and candidate terms. Consequently, a user that performs a search for a document using a different lexicon than commonly used, the searcher computing device is more likely to retrieve the most applicable results.

Additionally, included in FIG. 1 is the administrator computing device 102c. In the event that the lexicon generation computing device 102b requires oversight, updating, or correction, the administrator computing device 102c may be configured to provide the desired oversight, updating, and/or correction.

It should be understood that while the user computing device 102a and the administrator computing device 102c are depicted as personal computers and the lexicon generation computing device 102b is depicted as a server, these are merely examples. More specifically, in some embodiments any type of computing device (e.g. mobile computing device, personal computer, server, etc.) may be utilized for any of these components. Additionally, while each of these computing devices is illustrated in FIG. 1 as a single piece of hardware, this is also an example. More specifically, each of the user computing device 102a, lexicon generation computing device 102b, and administrator computing device 102c may represent a plurality of computers, servers, databases, etc.

Figure 2:
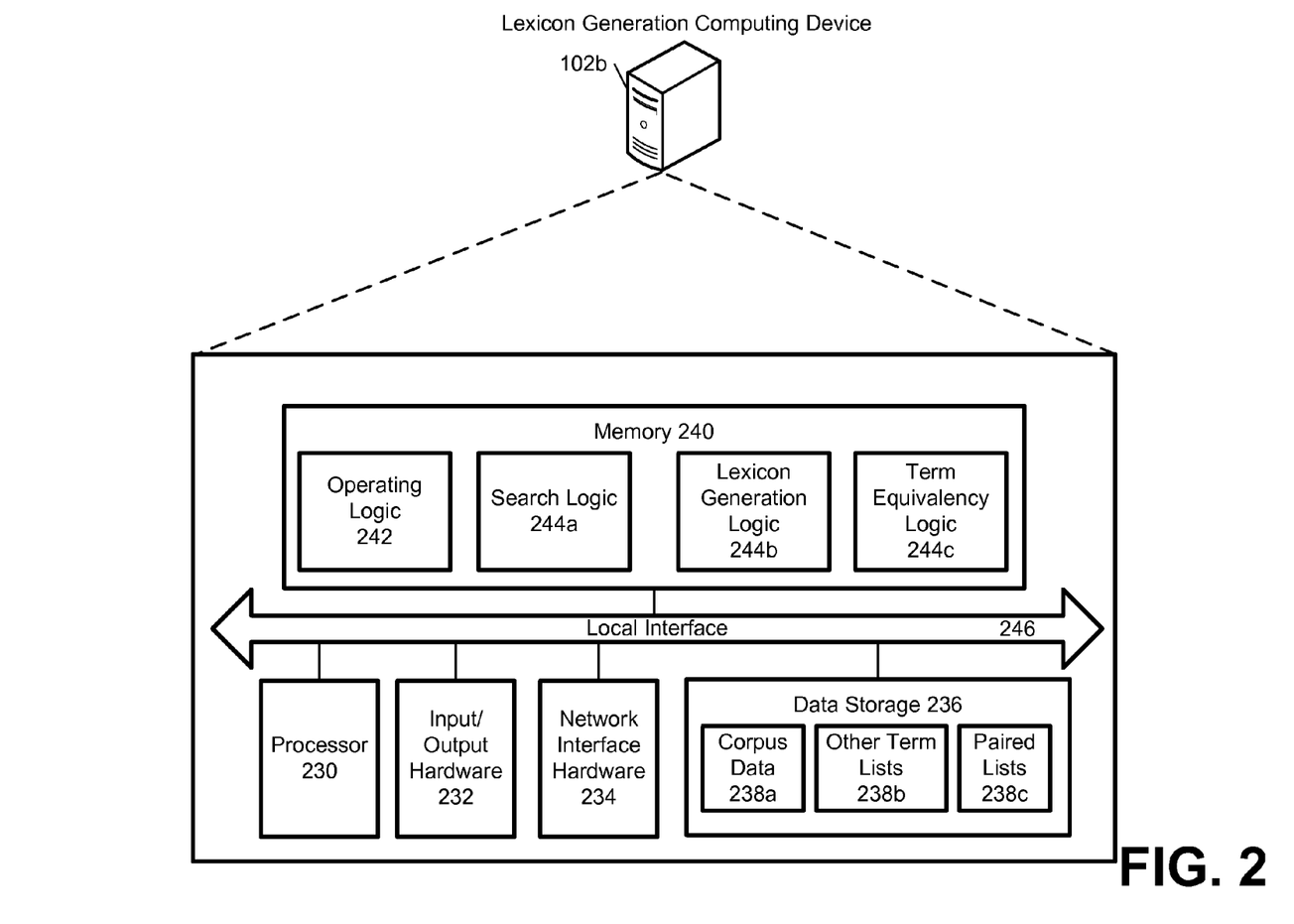
FIG. 2 depicts the computing device for lexicon generation from FIG. 1, further illustrating hardware and software that may be utilized in generating a term list and term equivalency list for the lexicon, according to embodiments show and described herein.

FIG. 2 depicts the lexicon generation computing device 102b, from FIG. 1, further illustrating a system for generating a lexicon and/or a non-transitory computer-readable medium for generating a lexicon embodied as hardware, software, and/or firmware, according to embodiments shown and described herein. While in some embodiments, the lexicon generation computing device 102b may be configured as a general purpose computer with the requisite hardware, software, and/or firmware, in some embodiments, the lexicon generation computing device 102b may be configured as a special purpose computer designed specifically for performing the functionality described herein.

As also illustrated in FIG. 2, the lexicon generation computing device 102b may include a processor 230, input/output hardware 232, network interface hardware 234, a data storage component 236 (which stores corpus data 238a, other term lists 238b, and paired lists 238c), and a memory component 240. The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242, search logic 244a, lexicon generation logic 244b, and term equivalency generation logic 244c (each of which may be embodied as a computer program, firmware, or hardware, as an example). A local interface 246 is also included in FIG. 2 and may be implemented as a bus or other interface to facilitate communication among the components of the lexicon generation computing device 102b.

The processor 230 may include any processing component configured to receive and execute instructions (such as from the data storage component 236 and/or memory component 240). The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 236 may reside local to and/or remote from the lexicon generation computing device 102b and may be configured to store one or more pieces of data for access by the lexicon generation computing device 102b and/or other components. As illustrated in FIG. 2, the data storage component 236 stores corpus data 238a, which in at least one embodiment, includes legal and/or other documents that have been organized and indexed for searching. The legal documents may include case decisions, briefs, forms, treatises, etc. Similarly, other term lists 238b may be stored by the data storage component 236 and may include one or more lists to be used by the lexicon generation logic 224b and the term equivalency logic 224c. Paired lists 238c may also be stored by the data storage component 236 and may include data related to a normalized term and the associated candidate terms (and/or equivalents).

Included in the memory component 240 are the operating logic 242, the search logic 244a, the lexicon generation logic 244b, and the term equivalency generation logic 244c. The operating logic 242 may include an operating system and/or other software for managing components of the lexicon generation computing device 102b. Similarly, the search logic 244a may reside in the memory component 240 and may be configured to facilitate electronic searches, such as by the user computing device 102a (FIG. 1). The search logic 244a may be configured to compile and/or organize documents and other data such that the electronic search may be more easily performed for the user computing device 102a. The search logic 244a may also be configured to provide data for a user interface to the user computing device 102a, receive a search request, retrieve the associated documents, and provide access to those documents to the user computing device 102a.

As is also illustrated in FIG. 2, the lexicon generation logic 244b may reside in the memory component 240. As described in more detail below, the lexicon generation logic 244b may be configured to locate corpus terms (phrases and single words) from the corpus data 238a, and determine candidate terms to use based on frequency of usage found in the corpus data 238a. Further, the term equivalency generation logic 244c may be configured to generate term equivalents, based on candidate terms determined in the previous portion of the sequence by lexicon generation logic 244b, as described in more detail below. While the search logic 244a, the lexicon generation logic 244b, and the term equivalency generation logic 244c are illustrated as different components, this is merely an example. More specifically, in some embodiments, the functionality described herein for any of these components may be combined into a single component.

It should also be understood that the components illustrated in FIG. 2 are merely exemplary and are not intended to limit the scope of this disclosure. More specifically, while the components in FIG. 2 are illustrated as residing within the lexicon generation computing device 102b, this is merely an example. In some embodiments, one or more of the components may reside external to the lexicon generation computing device 102b. Similarly, while FIG. 2 is directed to the lexicon generation computing device 102b, other components such as the user computing device 102a and the administrator computing device 102c may include similar hardware, software, and/or firmware.

Figure 3:
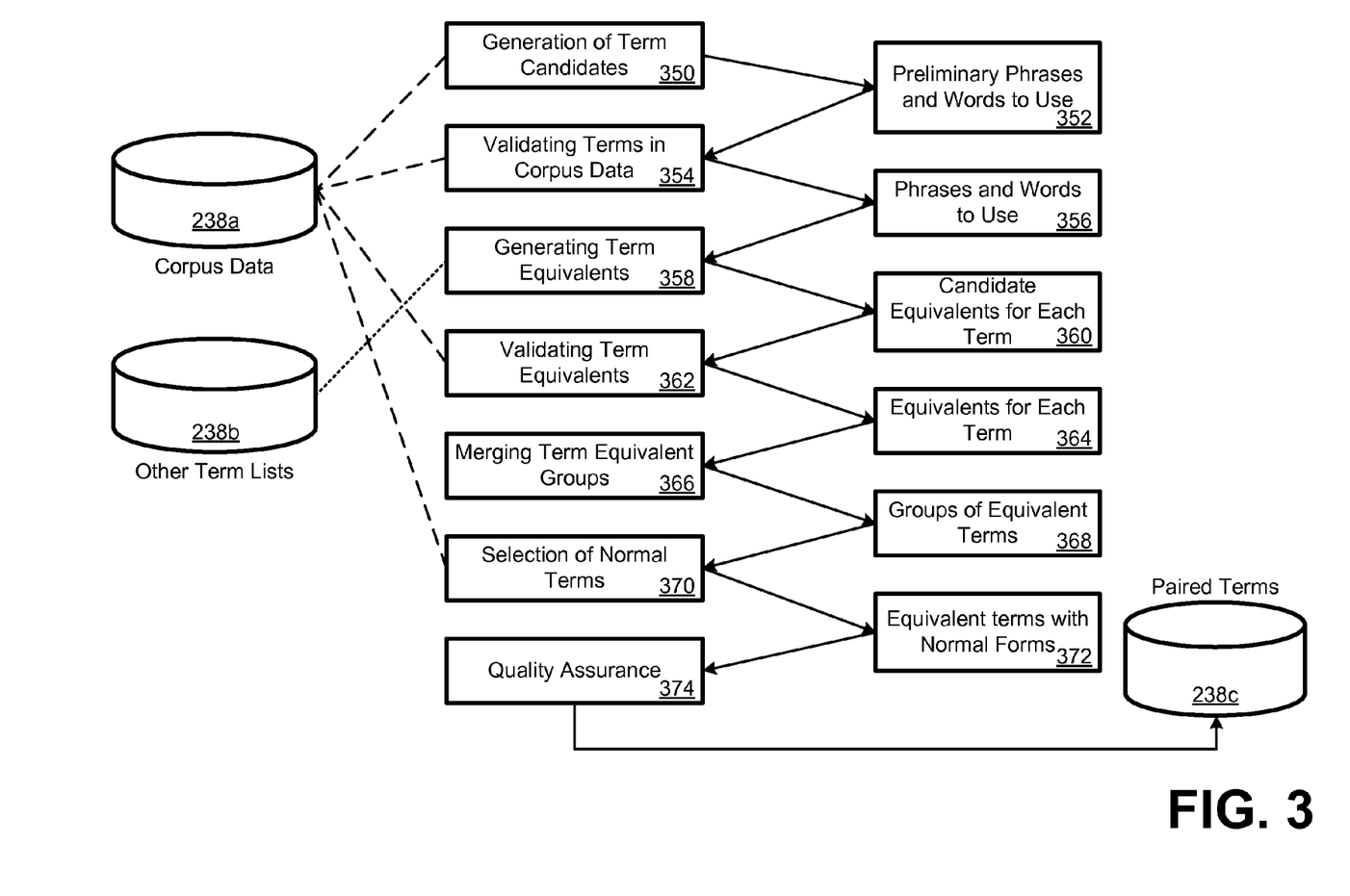
FIG. 3 depicts a flowchart, illustrating a process that may be utilized for implementing lexicon generation, according to embodiments shown and described herein.

FIG. 3 depicts a flowchart, illustrating a process that may be utilized for implementing lexicon generation, according to embodiments shown and described herein. As illustrated, in FIG. 3, the lexicon generation logic 244b may generate term candidates for lexicon generation (block 350). More specifically, the corpus data 238a may include a listing of corpus terms that may be used in a future search. The lexicon generation logic 244b (via the processor 230) can retrieve the corpus terms from the corpus data 238a and generate candidate terms associated with those corpus terms. As an example, if the corpus term "insufficient evidence" is located in the corpus data 238a, the lexicon generation logic 244b, based on its linguistic and contextual clues, the term becomes a potential candidate term for the next portion of the process.

It should be understood that generation of the candidate terms may include one or more techniques for determining variants of the corpus terms. As an example, the lexicon generation logic 244b may be configured to access the data storage component 236 to identify different forms of terms in the corpus (e.g. plural form, different conjugations, etc.). From this determination, the lexicon generation logic 244b may identify preliminary phrases and words to use as candidate terms (block 352).

Once the candidate terms are generated, the candidate terms can be validated in the corpus data 238a (block 354). More specifically, the candidate terms may be searched against the corpus data 238a, (e.g. with a finite state machine), and the result may be calculated to create a document frequency file. The document frequency file may be compared with a predetermined threshold of occurrences (e.g. 0, 1, 2, 3, etc.) and terms that are found in documents fewer than or equal to the threshold will be removed. Once the candidates are validated, the phrases and words used in the processing are solidified (block 356).

Additionally, term equivalents may be generated by the term equivalency logic 244c (block 358). More specifically, potential equivalent terms for each term in block 356 may be programmatically generated by the term equivalency logic 244c assisted by rules specified in the term equivalency logic 244c and the supplemental information provided in term lists 238b. As an example, the term lists 238b may be used as a supplement of information to the process of block 358 and may include rules encoded that may not be handled otherwise. Such rules may be configured to understand that the plural form of the term "child" is "children", where utilizing the normal plural form for words (e.g., adding an 's' or 'es') would be inapplicable. As a result, generation of the term equivalents may provide candidate equivalent terms (block 360). In the example given above, where "insufficient evidence" is identified from the corpus data 238a, the lexicon generation logic 244b in block 358 can generate its equivalent terms such as "insufficient evidences," "insufficiency of the evidence," "insufficiency of evidences," etc. These equivalent terms are stored in block 360 as candidate equivalents waiting for validation.

Similarly, validation of the candidate equivalents (block 362) is based on usage frequencies, and yields equivalent term list (block 364). The pairs of equivalent terms can then be merged and/or linked (block 366) based on rules specified in term equivalency logic 244c to form equivalent term groups. The merging may simply include combining the two pieces of data and/or removing duplicates to create the groups of equivalent terms (block 368). However, in some embodiments, equivalent pairs of terms may be collected and a determination can be made regarding whether the equivalent pairs are also equivalent. If so, these equivalent pairs may be merged together into a group of equivalent terms.

Additionally, normalized terms may be selected from the consolidated groups of terms (block 370), discussed above. More specifically, for each group of terms a determination may be made using heuristic rules (such as frequency, noun plurality, etc.) to determine which of the terms to designate as the normalized term. Referring to the example above, a group of terms may be found in documents located in the corpus data 238a according to the following:

TABLE 1

| TERM | FREQUENCY |
| --- | --- |
| Insufficient evidence | 17268 |
| Insufficiency of the evidence | 6927 |
| Insufficiency of evidence | 2969 |
| Evidence insufficient | 809 |
| Evidentiary insufficiency | 154 |

As illustrated in Table 1, the term "insufficient evidence" occurs more frequently in documents located in the corpus data 238a than the other terms in this group. Additionally, as "insufficient evidence" is the simplest term in the group, "insufficient evidence" may be selected as the normalized term for the group. Accordingly, lexicon matched terms that include equivalent terms with normalized forms may be identified (block 372). A quality assurance check may be performed (automatically and/or manually) at block 374. After quality assurance, the lexicon matched terms may be stored in the paired lists 238c. Once lexicon matched terms are stored, a user-designated search may be performed utilizing the lexicon matched terms.

Figure 4:
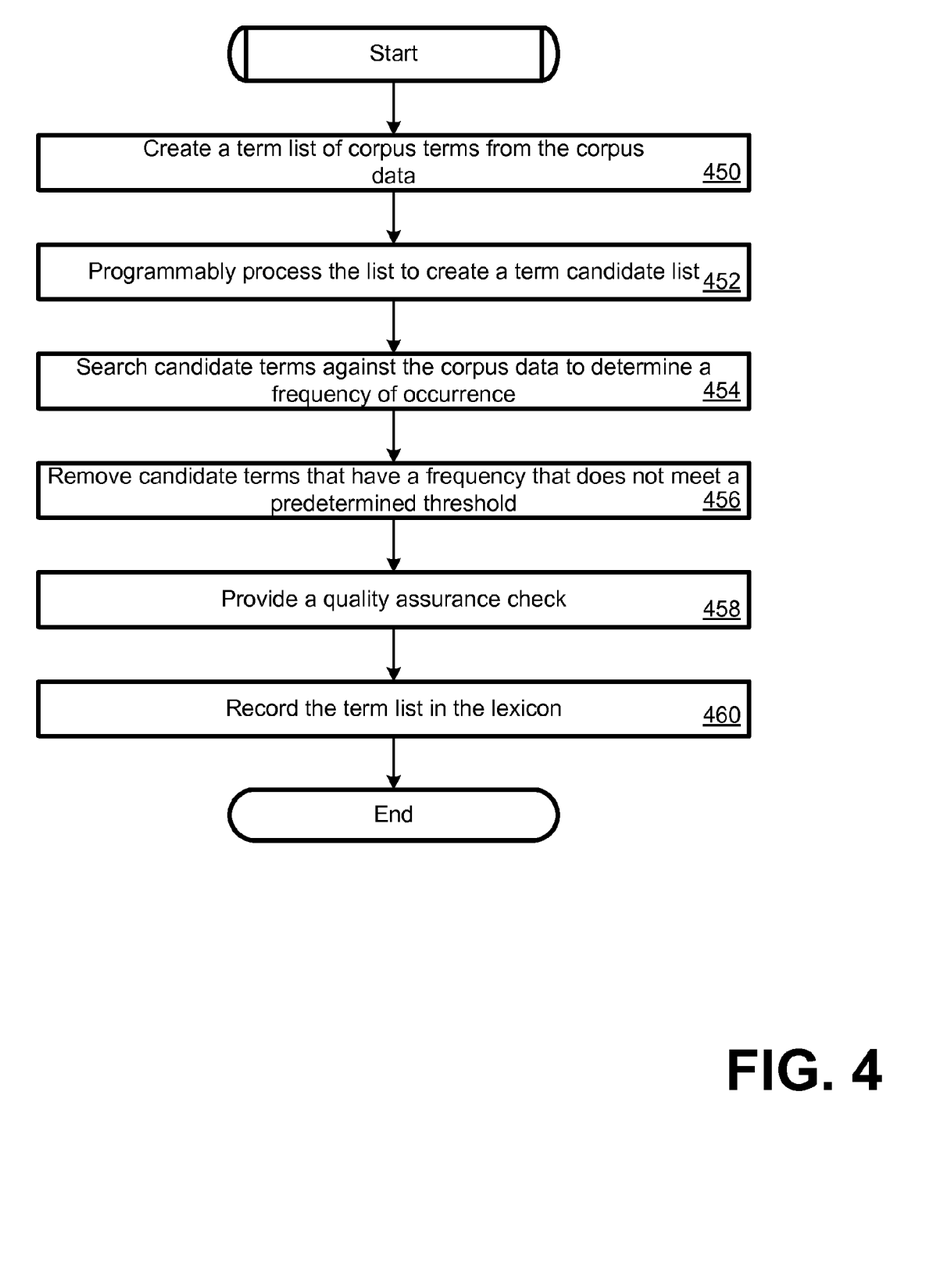
FIG. 4 depicts a process that may be utilized for generating initial terms from the corpus, according to embodiments shown and described herein.

FIG. 4 depicts a process that may be utilized for generating initial terms from the corpus, such as may be performed through use of the lexicon generation logic 244b, according to embodiments shown and described herein. As illustrated in FIG. 4, a term list of corpus terms from the corpus data 238a can be created (block 450). The list may additionally be programmably processed to create a term candidate list (block 452). The candidate terms may be searched against the corpus data to determine a frequency of occurrence in documents that are provided in the corpus data 238a (block 454). The candidate terms that have a frequency that does not meet a predetermined threshold can be removed (block 456). Additionally, a quality assurance check may be performed (block 458). Additionally, the term list can be recorded in the lexicon (block 460).

Figure 5:
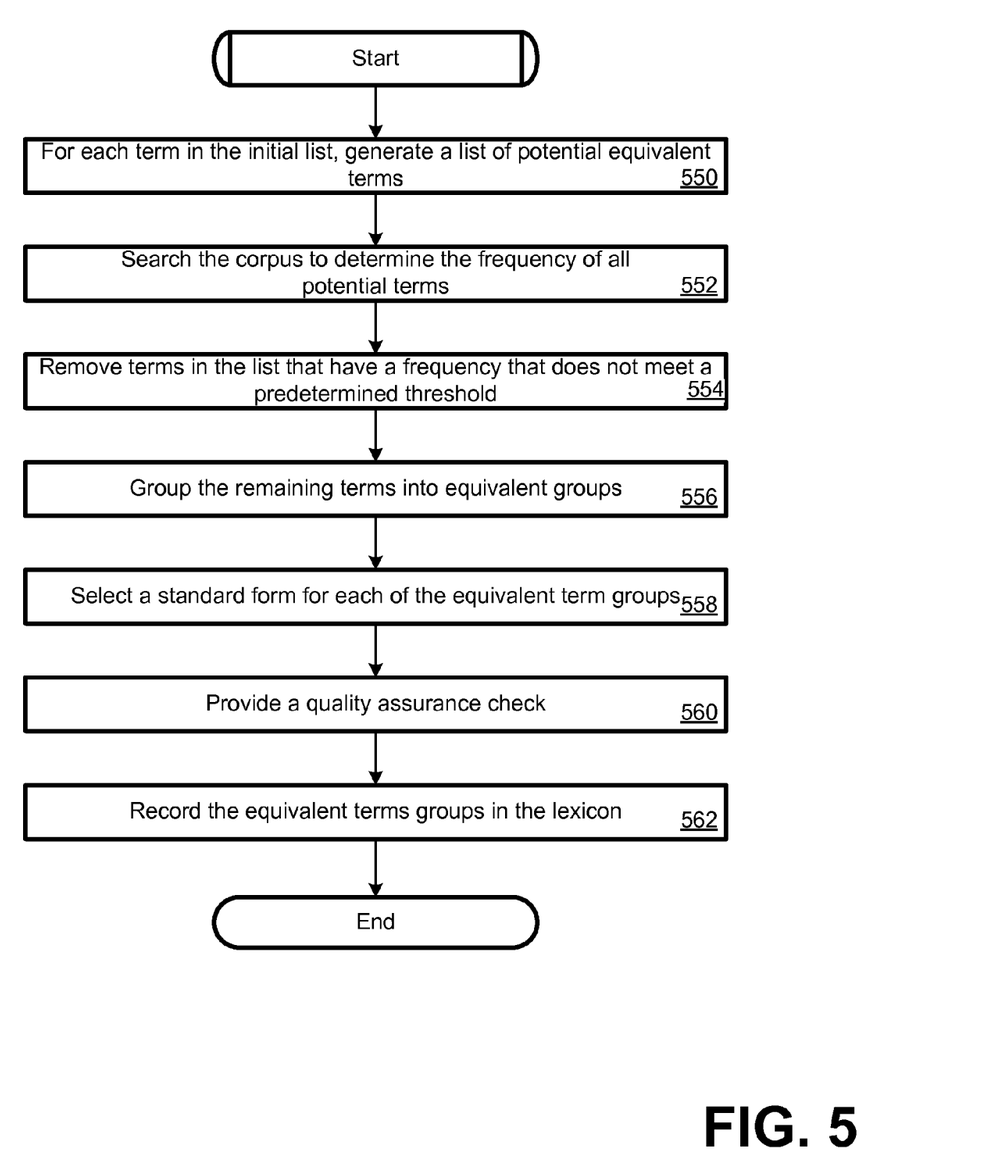
FIG. 5 depicts a process that may be utilized for generating equivalency grouping of terms for the lexicon, according to embodiments shown and described herein.

FIG. 5 depicts a process that may be utilized for generating equivalency grouping of terms for the lexicon, such as may be performed through use of the term equivalency generation logic 244c, according to embodiments shown and described herein. As illustrated in FIG. 5, a list of potential equivalent terms may be generated for each term in the initial list (block 550). The corpus may then be searched to determine the frequency of all potential terms (block 552). Candidate terms that have a frequency of occurrence that does not meet a predetermined threshold may be removed (block 554). The remaining terms may be grouped into equivalent terms (block 556). A standard form for each of the equivalent term groups may be selected (block 558). Further, a quality assurance check may be performed (block 560). The equivalent term groups may then be recorded in the lexicon (block 562).

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for lexicon generation, comprising the steps of:
   determining a corpus term from a plurality of documents;
   generating a candidate term from the corpus term, wherein generating the candidate term comprises generating a linguistic variant of the corpus term;
   generating a plurality of equivalent terms from the candidate term;
   validating the plurality of equivalent terms by comparing the plurality of equivalent terms to frequency of occurrence of the candidate term;
   linking each of the plurality of equivalent terms to the candidate term to create respective equivalent term pairs;
   determining whether any of the equivalent term pairs are equivalent and, in response to determining that at least two of equivalent term pairs are equivalent, merging the equivalent term pairs to create a group of equivalent terms;
   selecting a normalized term from the group of equivalent terms; and
   storing the group of equivalent terms.

2. The method of claim 1, further comprising the steps of:
   determining the frequency of occurrence for the candidate term in the first document,
   determining whether the frequency of occurrence for the candidate term does not meet a predetermined threshold; and
   in response to determining that the frequency of occurrence for the candidate term does not meet the predetermined threshold, removing the candidate term.

3. The method of claim 1, wherein the normalized term is selected based on a frequency of the candidate term and the corpus term in the plurality of documents.

4. The method of claim 1, wherein the electronic search capability includes an electronic searching system for locating legal documents.

5. A system for lexicon generation, comprising:
   a processor; and
   a memory component that stores lexicon generation logic that when executed by the processor, causes a computer to perform at least the following:
      determine a corpus term from a plurality of documents;
      generate a candidate term from the corpus term, wherein generating the candidate term comprises generating a linguistic variant of the corpus term;
      generate a plurality of equivalent terms from the candidate term;
      validate the plurality of equivalent terms by comparing the plurality of equivalent terms to a frequency of occurrence of the candidate term;
      link each of the plurality of equivalent terms to the candidate term to create respective equivalent term pairs;
      determine whether any of the equivalent term pairs are equivalent and, in response to determining that at least two of equivalent term pairs are equivalent, merging the equivalent term pairs to create a group of equivalent terms;
      select a normalized term from the group of equivalent terms; and
      store the group of equivalent terms.

6. The system of claim 5, the lexicon generation logic further configured to cause the computer to determine the frequency of occurrence for the candidate term in at least a portion of the plurality of documents.

7. The system of claim 6, the lexicon generation logic further configured to cause the computer to perform the following:
   determine whether the frequency of occurrence for the candidate term meets a predetermined threshold; and
   in response to determining that the frequency of occurrence for the candidate term meets the predetermined threshold, remove the candidate term.

8. The system of claim 5, wherein the normalized term is selected based on a frequency of the candidate term and the corpus term in the plurality of documents.

9. The system of claim 5, wherein the memory component further stores search logic that is configured to provide an electronic searching system for locating legal documents.

10. A non-transitory computer-readable medium for lexicon generation that stores a program that, when executed by a computer, causes the computer to perform at least the following:
   determine a corpus term from a plurality of documents;
   generate a candidate term from the corpus term; term, wherein generating the candidate term comprises generating a linguistic variant of the corpus term;
   generate a plurality of equivalent terms from the candidate term;
   validate the plurality of equivalent terms by comparing the plurality of equivalent terms to a frequency of occurrence of the candidate term;
   link each of the plurality of equivalent terms to the candidate term to create respective equivalent term pairs;
   determine whether any of the equivalent term pairs are equivalent and, in response to determining that at least two of equivalent term pairs are equivalent, merging the equivalent term pairs to create a group of equivalent terms;
   select a normalized term from the group of equivalent terms; and
   store the group of equivalent terms.

11. The non-transitory computer-readable medium of claim 10, the program further causing the computer to determine the frequency of occurrence for the candidate term in at least a portion of the plurality of documents.

12. The non-transitory computer-readable medium of claim 11, the program further causing the computer to perform at least the following:
   determine whether the frequency of occurrence for the candidate term meets a predetermined threshold; and
   in response to determining that the frequency of occurrence for the candidate term meets the predetermined threshold, remove the candidate term.

13. The non-transitory computer-readable medium of claim 10, wherein the normalized term is selected based on a frequency of the candidate term and the corpus term in the plurality of documents.

14. The non-transitory computer-readable medium of claim 10, the program being further configured to provide an electronic searching system for locating legal documents.

15. The non-transitory computer-readable medium of claim 10, the program further causing the computer to generate an equivalent term to the candidate term.

* * * * *